H. M. B. BARY.
WEIGHING SCALE.
APPLICATION FILED MAR. 4, 1911.
1,023,496.
Patented Apr. 16, 1912.
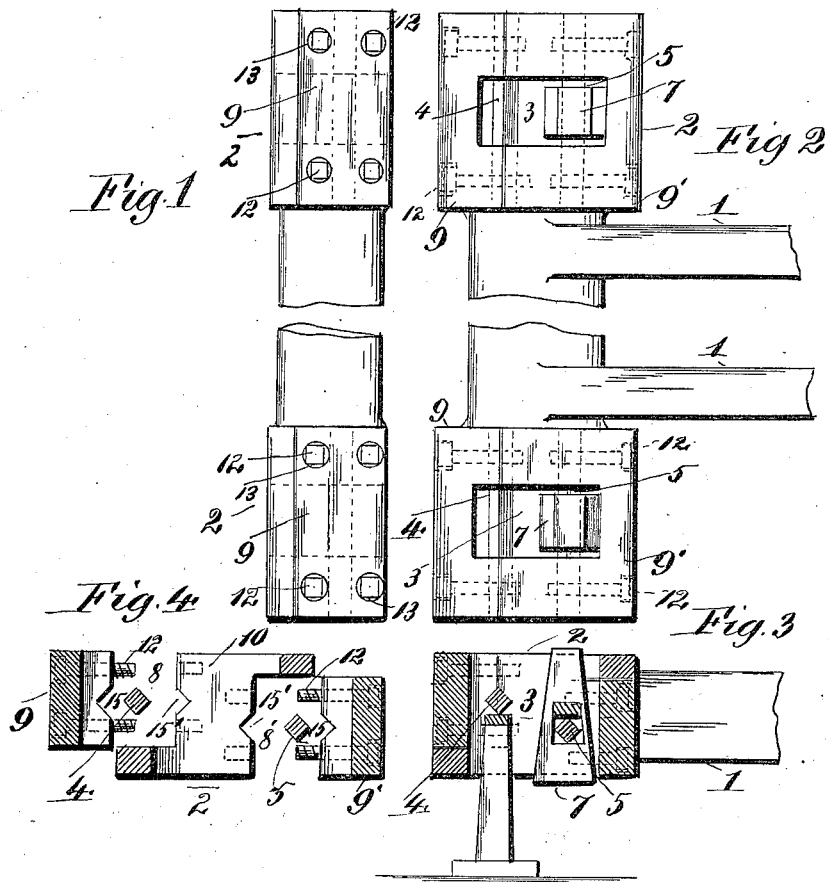

UNITED STATES PATENT OFFICE.

HENRY M. B. BARY, OF PHILADELPHIA, PENNSYLVANIA.

WEIGHING-SCALE.

1,023,496.  Specification of Letters Patent.  Patented Apr. 16, 1912.

Application filed March 4, 1911. Serial No. 612,419.

*To all whom it may concern:*

Be it known that I, HENRY M. B. BARY, citizen of the United States, residing at Philadelphia, in the county of Philadelphia and State of Pennsylvania, have invented certain new and useful Improvements in Weighing-Scales, of which the following is a specification, reference being had therein to the accompanying drawing.

This invention has relation to weighing scales and more particularly to railway track scales or other weighing mechanism of large dimensions, and has for its object the provision of means for securing in position the knife edge bearings and for facilitating the removal of the same when worn or defective and for substituting others.

As is well known, the accuracy of a weighing scale depends in a large measure on the fineness of the supporting or knife edges of the bearings and that these edges are frequently subjected to such usage as to dull them and render them inaccurate. It is difficult to remove the defective bearings and to substitute others, as the ordinary knife edge bearings are secured by being inserted wedge like, endwise into sockets, and can only be removed by being driven out of their seats lengthwise. In some positions of the knife edges access for this purpose is exceedingly inconvenient and in any event is tedious and laborious and subjects the parts in which the bearings are held to hammering and other rough and harmful usage.

According to my present invention, I propose to secure the lengths or sections of hardened metal on which knife edges are formed, in sockets formed between clamping jaws, one of the jaws being the body of a weighing member, and the other a separate piece bolted thereto, and detachable, when necessary, for the purpose of removing the knife edge section and replacing the same, or substituting a new section or turning the section to a new edge.

It will be sufficient to describe my invention with reference to its application to the member of a weighing scale, as for instance, the main levers of a railway track scale, and in the accompanying drawing I have so illustrated it.

Figure 1 is an end view of a pair of connected weighing levers. Fig. 2 a plan view of the same. Fig. 3 a vertical longitudinal section through the end of one of the weighing levers. Fig. 4 a similar section with the separable clamping jaws and the knife edge sections separated.

The weighing lever 1, is, in this instance, formed with a square head 2, having a square opening 3, through which passes, transversely the knife edge sections 4, 5, of which the section 4, is the bearing which fulcrums the lever on the stationary standard 6, while the section 5 is the bearing which supports a weighted pendulous hanger 7, the upper end of which is the support for the weighing platform.

For the purposes of my invention, the lever head is formed, as clearly illustrated in Fig. 4, with rabbets at 8, 8' in which fit the detachable blocks 9, 9' which, when in position form end pieces or clamps. These end pieces and the middle section 10, to which they are applied, are pierced with bolt holes to receive clamping bolts or screws 12, the heads of which are conveniently accommodated in sockets 13. The sides of the clamps 9, 9', and the sides of the middle piece 10, are formed with recesses 15, 15' in which fit the ends of the knife edge sections which may be square, triangular, octagon or otherwise shaped, and the recesses shaped to correspond and when the sections are in position and the clamping jaws 9, 9', are bolted to the middle part 10, the knife edge sections will be clamped rigidly in position and when it is necessary they may be readily removed for repair, replacement or substitution, by loosening the clamps. The same expedient may be adopted in securing the knife edge lengths on other weighing members, the clamp seats and clamps being modified in shape to adapt them to their required positions.

Having described my invention, I claim:

In weighing scales, the combination with a weighing lever having an open head with rabbets at each end, of detachable blocks fitting in said rabbets, bolts passing through said blocks and into said lever, the abutting surfaces of said rabbets and said blocks being formed with opposing recesses and knife-edge sections fitting between said opposing recesses and extending across the open portion of the head.

In testimony whereof I affix my signature in presence of two witnesses.

HENRY M. B. BARY.

Witnesses:
 THOS. A. CONNOLLY,
 BENNETT S. JONES.

Copies of this patent may be obtained for five cents each, by addressing the "Commissioner of Patents, Washington, D. C."